United States Patent [19]
Quinn

[11] 3,774,867

[45] Nov. 27, 1973

[54] ACOUSTIC WING STALL DELAYING DEVICE

[75] Inventor: Brian P. Quinn, Dayton, Ohio

[73] Assignee: The United States of America as represented by the Secretary of the Air Force, Washington, D.C.

[22] Filed: June 27, 1972

[21] Appl. No.: 266,787

[52] U.S. Cl. .............................. 244/40 R, 244/130
[51] Int. Cl. ........................................... B64c 21/02
[58] Field of Search ................. 244/40 R, 40 A, 41, 244/42 R, 42 A, 42 C, 42 CA, 52 CG, 42 CH, 130, 120; 415/DIG. 1; 181/33 HC, 33 HD, 64 A; 116/137 R, 137 A, 140

[56] References Cited
UNITED STATES PATENTS

| 992,487 | 5/1911 | Ellison | 116/137 R |
| 2,176,809 | 10/1939 | Zap | 244/40 R |
| 2,585,676 | 2/1952 | Poisson-Quinton | 244/40 R |
| 2,783,008 | 2/1957 | Bodine | 244/130 |
| 2,853,852 | 9/1958 | Bodine | 244/130 X |

Primary Examiner—Milton Buchler
Assistant Examiner—Barry L. Kelmachter
Attorney—Harry A. Herbert, Jr. et al.

[57] ABSTRACT

An apparatus for delaying the onset of wing stall in an aircraft having a plurality of acoustic resonators positioned in the forward portion of the upper surface of the wing with a movable panel to close the resonator cavities during normal flight. The movable panels partially expose the resonator cavities to provide orifices which generate the desired acoustic signal of approximately the same frequency as in the flow field.

3 Claims, 5 Drawing Figures

3,774,867

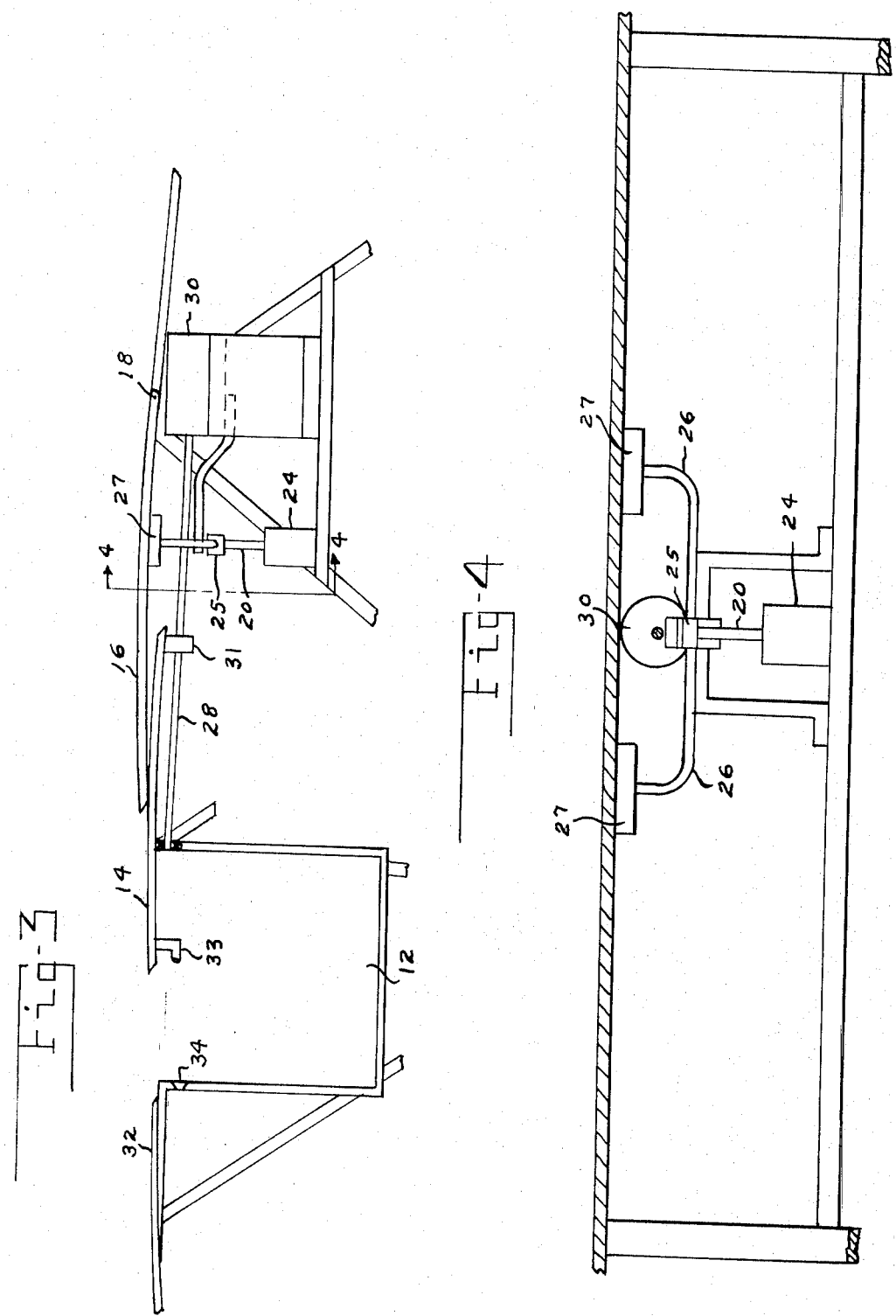

ACOUSTIC WING STALL DELAYING DEVICE

BACKGROUND OF THE INVENTION

High angles of attack are desirable, especially at slow speed to provide high lift. At high angles of attack, there is a tendency for aircraft wings to stall due to the fact that the boundary layer is unable to follow the contour of the wing. Various apparatus have been provided in the prior art for manipulating the boundary layer in an effort to increase lift and delay stall to higher angles of attack. In most of these systems, manipulation of the boundary layer takes the form of some means of sucking or blowing or a combination of both. In these systems some mechanical energy is needed to provide the sucking and blowing of air out of or into the boundary layer. Some have suggested providing an air flow from a high ambient pressure area of the wing or fuselage to the upper surface of the wing. This has not been highly successful because of the flow impedance in ducts leading from the high pressure region to the upper surface of the wing.

BRIEF SUMMARY OF THE INVENTION

It has been found that an airfoil could be made to recover from stall by impressing an acoustic field of the same frequency as in the stalled flow field. According to this invention, acoustic resonators are embedded in the upper surface in the forward portion of the wings. Air passing over the surface actuates the resonators to bathe the wings in an acoustic signal. The size of the resonator orifice is selected to provide strong aeroacoustic coupling between the airstream and the resonators.

IN THE DRAWINGS

FIG. 3 is an enlarged partially cut away view of the device of FIG. 2.

FIG. 4 is a sectional view of the device of FIG. 3 along the line 4—4.

DETAILED DESCRIPTION OF THE INVENTION

Figure 1:
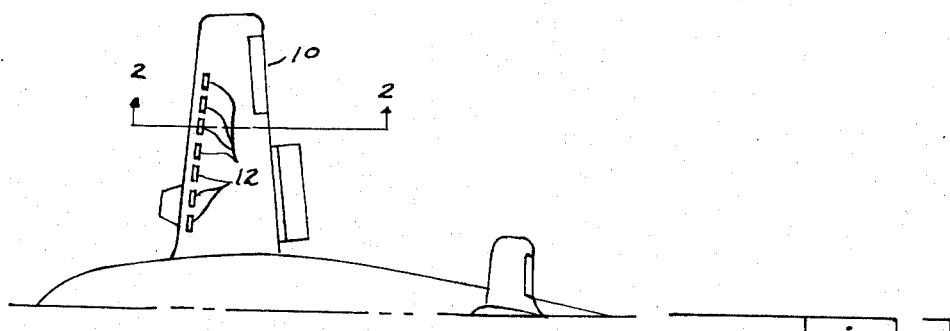
FIG. 1 is a schematic diagram of an aircraft including the acoustic resonators of the invention.

Referring now to FIG. 1 of the drawing, which shows an aircraft wing 10 having a plurality of cavity resonators 12 located in the top surface of the wing forward of the point of maximum wing thickness.

Figure 2:
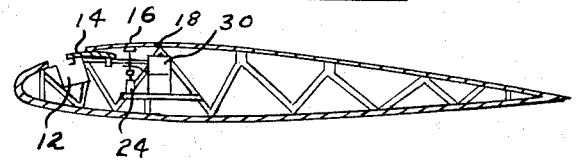
FIG. 2 is an enlarged partially schematic sectional view of the device of FIG. 1 along the line 2—2.

As shown in FIGS. 2 and 3, the resonator cavities have a movable panel 14 which is closed during normal flight and opened during takeoff and landing. The panel 14 is retracted by raising a panel 16 which is hinged at 18. The panel 16 is raised and lowered by means of a jack screw 20 which is driven by a motor 24. A threaded member 25 is raised and lowered by turning the jack screw 20. Arms 26 connected to member 25 and to members 27 on panels 16 raise and lower panel 16. The panel 14 is withdrawn to the desired position by means of a jack screw 28 which is driven by a motor 30. Threaded member 31 moves along jack screw 28 to open and close the panel 14. In its closed position the panel 14 mates with front panel member 32. A plurality of locking members 33, one of which is shown, engage recesses 34 to lock the panel in place. The motors 24 and 30 may be operated directly by the aircraft pilot by the closing of a switch to energize the motors or they can be energized to open the cavities automatically when the flaps are lowered and closed when the flaps are raised. Stops and limit switches, not shown, are provided to limit the travel of the panels 14 and 16.

As an aircraft approaches the landing field it is configured for slow speed flight. If the airfoil were to stall the air would separate and form a pocket of dead air on the lee surface of the airfoil. The interface between the dead air region and the freely flowing airstream is unstable and oscillates with a frequency that approximately satisfies the relationship $$f_I = KV/L \; \sqrt{R_o} \qquad (1)$$

where
$f_I$ = frequency of instability at stall in hertz
$V$ = flight speed in ft/sec
$L$ = the cord length in ft
$R_o$ = the Reynolds Number
$K$ = a constant that is a function of airfoil shape and is independent of the size of the airfoil.

The constnt K can be determined in wind tunnel tests with the aid of expression (1).

Because of its periodicity the frequency of the instability is related to its wave length $\lambda$ and the propagation speed C by the expression $$f_I = C/\lambda \qquad (2)$$

With the use of a smoke tunnel the values for C and $\lambda$ may be measured to determine the frequency $f_I$. Then by knowing the values, V, L and $R_o$ the constant K may be determined for a particular wing.

For example, the NACA 23012 airfoil which stalls approximately at an angle of attack $\alpha$ of about 16°, K is approximately equal to 0.0367.

Therefore from expression (1)

$$(f_I L)/V = 0.0367 \; \sqrt{R_o}$$

Figure 5:
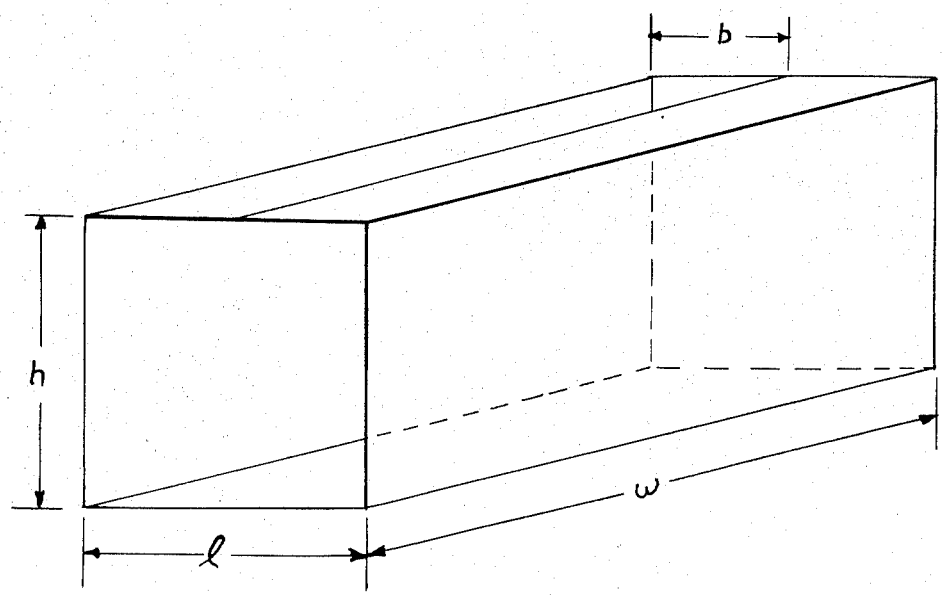
FIG. 5 is a schematic isometric view of a resonator for the device of FIG. 1.

With a NACA 23012 airfoil having a cord length L = 8 ft, supporting an aircraft landing at 120MPH (176 ft/sec) on a day where the ambient temperature is 68°F ($v = 164 \times 10^{-6}$)

$$\text{Then} \; \sqrt{R_o} = \sqrt{VL/v} = \sqrt{(176 \times 8)/164 \times 10^{-6}}$$
$$= 2920$$

Where $v$ is the kinematic viscosity of the ambient air at 68°F, and $f_I = 0.0367 \times 2920 \times 176/8$
$f_I = 2360$ hertz The frequencies of the resonant modes of a rectangular cavity with dimensions $l, h, \omega$ as shown in FIG. 5 are given by the expression:

$$f_{ijk} = a/2 \; [(i/l)^2 + (j/h)^2 + (k/\omega)^2]^{\text{one-half}}$$

where $a$ is the local sonic speed. For the first tangential mode $$i,j,k = (1, 1, 0)$$

with the ambient temperature $T_{amb} = 68°F$ $$a = 1125.2 \; \text{ft/sec.}$$

For a square cavity where $$l = h$$
$$f_R = a/2 \sqrt{2/l^2} = (a/\sqrt{2}l)$$

and $$l = (a/\sqrt{2} f_R) = (1125.2/\sqrt{2}\ 2360)$$
$$l = .338 \text{ ft} = 4.06 \text{ in.}$$

The cavity length $l$ and height $h$ would then be 4.06 inches. Since the frequency of the first tangential mode is independent of the width $w$, so that the width of the cavities may be made approximately equal to the space between the wing ribs.

Vortices in the orifice of the cavity translate at about one-half of the value of the local speed at the edge of the boundary layer $V_e$. At the separation point on a 23012 airfoil the velocity at the boundary layer edge $V_e$ is approximately equal to $1.7V$. The distance between vortices can be found from equation (2)

$$\lambda = (C \text{ vortex}/f_R) = 1/f_R \cdot V_e/2 = 1/f_R (1.7V/2)$$
$$\lambda = 176/2360 (.85) = .063 \text{ ft} = .756 \text{ in.}$$

Experiments have shown that a very strong aerocoustic coupling takes place when the vortex spacing is half the orifice width $b$ in FIG. 5. Thus $b$ should be $2\lambda = 1.512$.

In the operation of the device during takeoff the motors 24 and 30 can be energized to raise panel 16 and open panel 14 while the aircraft is taxiing toward the end of the runway. During takeoff, the airstream flowing over the wing energizes the resonators so that acoustic signal generated in the cavity bathes the boundary layer in an acoustic signal so that the tendency of the wing to stall at high angles of attack is considerably reduced. Once airborne the motors 24 and 30 are energized to close the cavities for normal flight. As the aircraft approaches the landing field and the aircraft is configured for slow speed flight motors 24 and 30 are again energized to raise panels 16 and to open panels 14 to again bathe the wings in an acoustic signal.

While electric motors are shown for moving panels 14 and 16 other means may be provided, for example, hydraulic actuators or pneumatic actuators could be used. Also the shape of the resonators need not be rectangular, as shown, since any shape that will provide the proper frequency and coupling can be used.

There is thus provided an apparatus which acts to delay stall to higher angles of attach which does not require the mechanical movement of air by sucking or blowing means in the aircraft wings.

I claim:

1. An airfoil for an aircraft, adapted to be moved through the air to provide an air flow over the surface of the airfoil, wherein the air stream, under stall conditions, forms a pocket of dead air adjacent the airfoil and wherein the interface between the dead air region and the freely flowing air stream oscillates at a frequency determined by the air flow and the size and shape of the airfoil, comprising: means for bathing the upper surface of the airfoil with an acoustic signal of a predetermined frequency corresponding to the frequency within said interface and means for selectively discontinuing the acoustic signal during normal flight of the aircraft.

2. The device as recited in claim 1 wherein said means for bathing the upper surface of the airfoil with an acoustic signal of a predetermined frequency, comprises: a plurality of cavity resonator elements positioned in the upper surface of the airfoil forward of the point of maximum thickness; means for providing a predetermined orifice for said cavity resonator elements; said means for selectively discontinuing the acoustic signal, including the means for providing a predetermined orifice for the cavity resonator elements and for selectively closing the cavity resonator elements to provide a smooth upper surface for the airfoil.

3. The device as recited in claim 2 wherein the means for providing a predetermined orifice for the resonators includes a panel which is movable from a closed position completely covering the resonator to an open position which uncovers a predetermined portion of the resonator.

* * * * *